July 23, 1946.    L. A. WILLIAMS, JR    2,404,676
HEATING APPARATUS
Filed Oct. 8, 1942
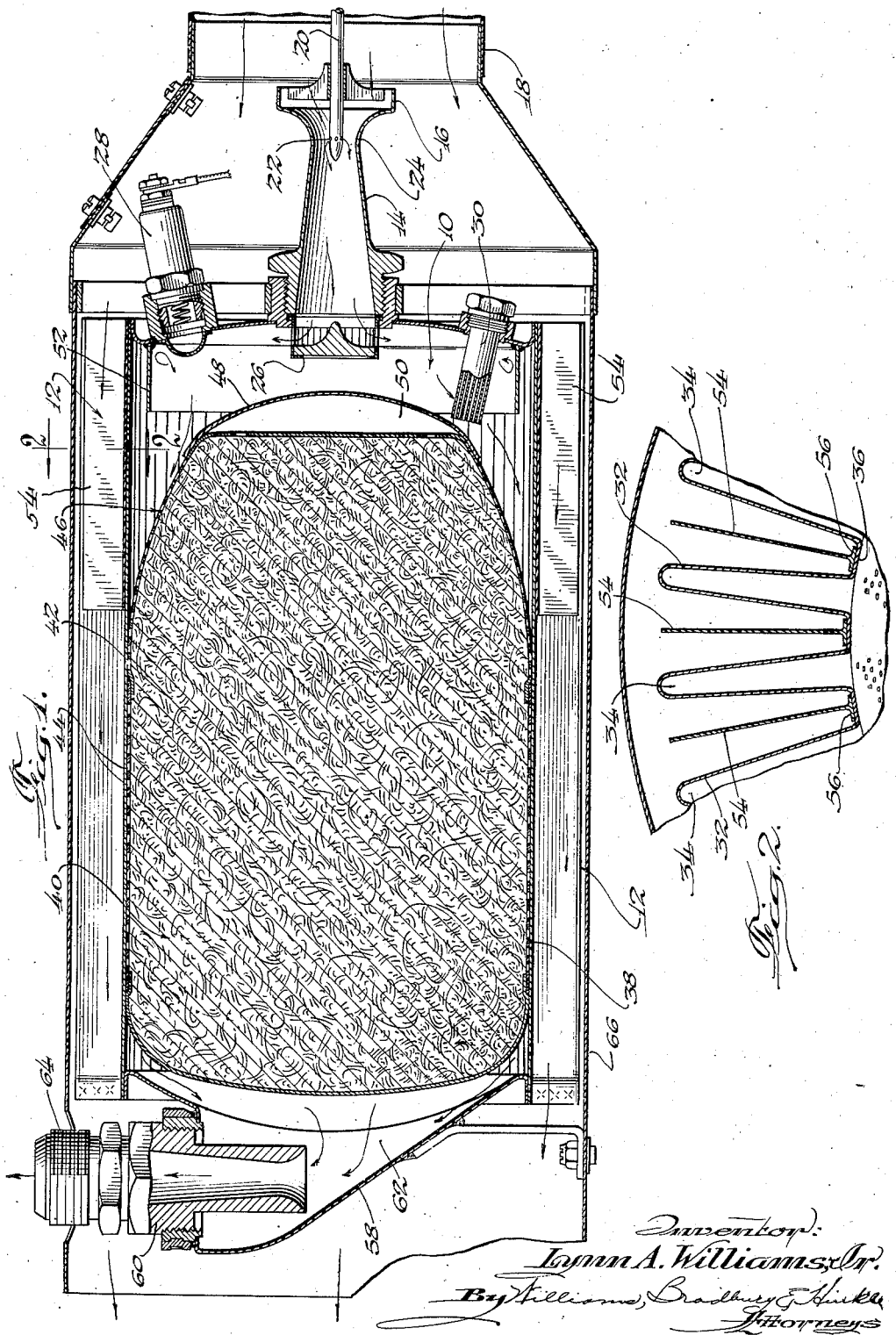
Inventor:
Lynn A. Williams, Jr.
By Williams, Bradbury & Hinkle
Attorneys Patented July 23, 1946

2,404,676

UNITED STATES PATENT OFFICE 2,404,676

HEATING APPARATUS

Lynn A. Williams, Jr., Northfield, Ill., assignor to Stewart-Warner Corporation, Chicago, Ill., a corporation of Virginia Application October 8, 1942, Serial No. 461,261

1 Claim. (Cl. 126—116)

My invention relates to heating apparatus and is more particularly concerned with, but is not limited to, heaters of the internal combustion type especially adapted for use in aircraft.

In heaters of the internal combustion type, it is common to provide finned transfer means for transferring heat from the products of combustion to ventilating air directed over the heat transfer means by a ram or blower or other suitable air circulating means. The heated products of combustion are originally directed against the fins at one end of the heat transfer means. Where the hot products of combustion first come in contact with these fins, they are raised to a temperature which is much in excess of the temperatures of other portions of the fins and particularly of that portion adjacent the outlet end of the heater. There is a practical limit to the temperature to which the fins can be heated and since the hottest portions of the fins can not be operated above this temperature limit, the total heat output of the heater is materially reduced where large portions of these fins are operated at a temperature materially below the practical limit.

An object of my invention is to provide heating apparatus of the internal combustion type in which local hot spots are eliminated and the heat transfer means is heated to substantially uniform temperature throughout its length.

Another object of my invention is to provide heating apparatus wherein the temperature range between different parts of the heat transfer means is reduced to a minimum and stresses and strains caused by great variations in the temperature of different portions of the heat transfer means are avoided.

Another object of my invention is to increase the efficiency of the heating apparatus by maintaining all portions of the heat transfer means at substantially the practical temperature limit.

Another object of my invention is to provide new and improved heating apparatus which is extremely light in weight and compact and has a high heat output.

Another object of my invention is to provide new and improved heat transfer means.

Other object and advantages will become apparent as the description proceeds.

In the drawing:

Fig. 1 is a view showing a longitudinal section through heating apparatus embodying my invention; and Fig. 2 is a transverse, sectional view taken on the line 2—2 of Fig. 1 and showing part of my novel heat transfer means in enlarged section.

The heating apparatus illustrated in the drawing is an internal combustion type of heater incorporating a typical embodiment of my invention. This heater has a combustion chamber 10 located in one end of a tubular heat transfer means or heat exchanger 12 and supplying hot products of combustion to this heat exchanger. A carburetor 14 has an open end 16 receiving combustion air from the heater inlet 18, which is adapted to be connected to a ram, blower, or other air circulating means. The air entering the carburetor 14 is mixed with fuel supplied through a pipe 20 having outlet openings 22 located at the throat 24 of the carburetor 14. The combustible mixture formed in the carburetor 14 is delivered to the combustion chamber 10 through a burner tube 26 which is designed to give the combustible mixture a whirling motion as it enters the combustion chamber.

The combustion chamber 10 is provided with one or more electrical igniters 28 for initially igniting the combustible mixture supplied to this chamber. It will be understood by those skilled in the art that the igniters 28 are connected to a suitable source of electrical energy through a thermostatic switch which is responsive to the temperature of the heater and serves to disconnect these igniters from their source of current when the heater attains normal operating temperature. A re-igniter 30 is provided to insure continued burning of the combustible mixture supplied to the combustion chamber after the igniters 28 have ceased to function.

The tubular heat exchanger 12 is made of thin sheet metal, such, for example, as stainless steel, and has hollow fins 32 extending longitudinally thereof. The ends of the fins are sealed and the interiors of these hollow fins constitute gas passages 34 for the hot products of combustion supplied by the combustion chamber 10 to the inlet ends of these passages adjacent the combustion chamber. The hollow fins 32 are provided with bases 36 and portions of these bases surround and closely engage the sheet metal shell 38 of a muffler 40 which is filled with sound absorbing material 42, such as glass wool or stainless steel wool. The shell 38 is provided with a plurality of openings 44 which form acoustic couplings between the interior of the muffler shell and the gas passages 34, whereby sound may enter the muffler shell and be absorbed by the glass wool or other material therein.

The muffler 40 has a tapered end 46 which is covered by a rounded cap or nose 48 located adjacent the combustion chamber 10. A space 50 located between the cap 48 and the adjacent end of the muffler shell serves as a heat insulator to protect the sound absorbing material from the more intense heat created in the combustion chamber. The cap 48 is preferably of heat resisting metal and is welded or otherwise attached to the end of the muffler shell.

The hot products of combustion formed in the combustion chamber 10 flow from the open lefthand end of this chamber around the tapered end of the muffler and into the gas passages 34 in the hollow fins. The annular wall 52 of the combustion chamber is illustrated as being spaced from the bases of the fins and this arrangement and the tapered end of the muffler permit these gases to first contact the heat exchanger 12 over an appreciable portion of its length. By thus creating a relatively large area over which the hot products of combustion first establish contact with the heat exchanger, the creation of intensely heated local hot spots in the heat exchanger, and more particularly in the bases of the hollow fins, is avoided. Even with this arrangement, however, those portions of the fin bases with which the hot products of combustion first come in contact, would be heated to a higher temperature than the rest of the heat exchanger, unless special means is provided to carry off more rapidly heat from these portions of the finned bases. My invention lies in the provision of such special means.

My novel means for reducing the temperature of these portions of the fin bases which are first contacted by the hot products of combustion is best illustrated in Fig. 2. This means comprises the provision of auxiliary fins 54 located between the hollow fins 32 and extending only throughout that portion of the heat exchanger which is first contacted by the hot products of combustion from the combustion chamber 10. The auxiliary fins 54 are illustrated as being formed of sheet metal and as being of T-shape in cross section. The heads 56 of the fins 54 extend lengthwise of the bases 36 of the hollow fins and are secured thereto by welding, silver soldering, or in any other suitable manner so that the heads 56 are in intimate, heat-conducting contact with these bases 36. Large quantities of heat absorbed by the bases 36 of the hollow fins are transmitted to the auxiliary fins 54, which dissipate this heat to the ventilating air and thus reduce the operating temperature of the fin bases where these bases are first contacted by the hot products of combustion. The auxiliary fins 54 may be made of any suitable length, but I have found that entirely satisfactory results are obtained where these auxiliary fins are substantially co-extensive with that portion of the heat exchanger which is first contacted by the hot products of combustion.

The lefthand end of the heat exchanger 12 is closed by a plate 58 supporting an outlet fitting 60. The hot products of combustion give up their heat to the heat exchanger 12, as they flow lengthwise of the passages 34 in the hollow fins, and the cooled gases then flow from the lefthand ends of the passages 34 into an outlet chamber 62 formed between the plate 58 and the adjacent end of the muffler 40. These gases are discharged through the outlet fitting 60 and pass to atmosphere through any suitable exhaust pipe attached to the threaded end 64 of the outlet fitting.

The heat transfer means 12, carburetor 14, and adjacent parts are enclosed within a sheet metal casing 66 connected to the air inlet 18. The casing has a cylindrical part which closely surrounds the heat exchanger 12 and cooperates therewith to form ventilating air passages between and around the hollow fins 32. The ventilating air flowing through these passages absorbs heat from the hollow fins 32 and the auxiliary fins 54 and the heated ventilating air is discharged from the lefthand end of the casing 66 into the air craft cabin, or other space to be heated, or into a system of ducts for conducting this heated air to variously located outlets.

When the heater is in operation, the auxiliary fins 54 conduct heat away from the adjacent portions of the bases 36 of the hollow fins with sufficient rapidity to maintain these portions of the bases at substantially the same temperature as other portions of the heat exchanger. In other words, the entire heat exchanger is maintained at substantially the same temperature during heater operation. Since this temperature may be the practical temperature limit at which the heat exchanger can be maintained, the heat output of my novel heater may be the maximum possible for the materials used. This provides a light and compact heater of high output and wherein durability and long life are insured by the absence of stresses and strains resulting from substantial temperature variations in the heat exchanger. Such a heater is particularly adapted for, but not limited to, use in aircraft.

While my novel heat exchanger with its auxiliary fins at one end thereof is particularly adapted for use in a heater of the internal combustion type, this heat exchanger is not limited to such use. Under some circumstances, my new and improved heat exchanger is particularly advantageous in connection with exhaust heaters where the hot exhaust gases are delivered to one end of the heat exchanger and tend to raise the temperature of the fin bases adjacent this end above the temperature of other portions of the heat exchanger. My invention is also not limited to the details herein shown and described, but may assume numerous other forms and my invention is to be construed as including all variations and modifications falling within the scope of the appended claim.

I claim:

A heating apparatus of the class described, comprising in combination a heat exchange member formed of thin sheet metal and having deep longitudinally extending corrugations in its wall providing outwardly projecting hollow fins in spaced relation to each other about said member, means forming a combustion chamber at the rear end of said heat exchange member adapted to supply hot gases to the interior of said member and said fins, a backwardly tapered muffler in said heat exchange member serving to close the inner faces of the fins through a substantial portion of their length at their forward portions, outwardly projecting auxiliary fins in the form of solid metal plates secured in position in the spaces between said fins by means of flange portions turned at an angle to the fins and in snug engagement with the outer faces of the wall portions between said first named fins and extending longitudinally adjacent the tapered portion of said muffler, and means for feeding ventilating air through the spaces between said fins for heating said ventilating air and for protecting the fins from burning out.

LYNN A. WILLIAMS, Jr.